United States Patent
Nishimura et al.

(10) Patent No.: US 11,644,104 B2
(45) Date of Patent: May 9, 2023

(54) STEAM VALVE

(71) Applicant: MITSUBISHI HEAVY INDUSTRIES, LTD., Tokyo (JP)

(72) Inventors: Kenya Nishimura, Tokyo (JP); Atsushi Yamashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/591,337

(22) Filed: Feb. 2, 2022

(65) Prior Publication Data
US 2022/0299117 A1    Sep. 22, 2022

(30) Foreign Application Priority Data
Mar. 18, 2021    (JP) .............................. JP2021-045091

(51) Int. Cl.
*F16K 1/52*    (2006.01)
*F01D 17/00*    (2006.01)
(Continued)

(52) U.S. Cl.
CPC .............. *F16K 1/526* (2013.01); *F01D 17/00* (2013.01); *F16K 27/02* (2013.01); *F16T 1/00* (2013.01)

(58) Field of Classification Search
CPC .......... F16K 1/526; F16K 27/02; F01D 17/00; F16T 1/00
(Continued)

(56) References Cited

U.S. PATENT DOCUMENTS 863,084 A * 8/1907 McKee .................. F01D 17/18
                                                    415/37
2,105,681 A * 1/1938 Armstrong ........... G05D 7/0153
                                                    137/498
(Continued)

FOREIGN PATENT DOCUMENTS

CN          110500414 A     11/2019
DE     102017221205 A1     5/2019
(Continued)

OTHER PUBLICATIONS

Office Action dated Feb. 7, 2023, issued in counterpart JP application No. 2021-045091, with English translation (6 pages).
(Continued)

*Primary Examiner* — Angelisa L. Hicks
(74) *Attorney, Agent, or Firm* — WHDA, LLP

(57) ABSTRACT

Staying of a drain on a cylinder attached to a lower side of a valve casing is suppressed, and occurrence of corrosion of the cylinder is suppressed.
A steam valve includes a valve casing, a valve disc disposed within the valve casing, a cylinder disposed on a lower side of the valve casing and having a piston rod extending upward, a valve stem vertically penetrating a lower portion of the valve casing and having one end coupled to the piston rod via a coupling and having another end coupled to the valve disc, a cover having a larger diameter than the piston rod and the coupling and configured to separate the piston rod and the coupling from each other by being interposed between the piston rod and the coupling, and a tubular skirt hanging down from a peripheral portion of the cover and surrounding a periphery of a head portion of the piston rod.

4 Claims, 6 Drawing Sheets

(51) Int. Cl.
*F16K 27/02* (2006.01)
*F16T 1/00* (2006.01)

(58) Field of Classification Search
USPC .................................................. 251/118, 333
See application file for complete search history.

(56) References Cited

U.S. PATENT DOCUMENTS

| | | | | |
|---|---|---|---|---|
| 3,987,818 | A * | 10/1976 | Williams | F16K 17/10 251/25 |
| 4,383,553 | A * | 5/1983 | Platt | F16K 47/02 138/46 |
| 4,569,370 | A * | 2/1986 | Witt | F16K 3/26 137/625.37 |
| 5,172,719 | A * | 12/1992 | Dawawala | F01D 17/145 251/63.6 |
| 5,848,608 | A * | 12/1998 | Ishigaki | F16K 41/10 251/60 |
| 6,494,229 | B2 * | 12/2002 | Kajitani | F16K 31/1221 137/530 |
| 10,816,102 | B2 * | 10/2020 | Forte | F16K 1/385 |

FOREIGN PATENT DOCUMENTS

| | | |
|---|---|---|
| GB | 1306786 A | 2/1973 |
| JP | H06-280826 A | 10/1994 |
| JP | 11-343811 A | 12/1999 |
| JP | 2005-98319 A | 4/2005 |
| JP | 2013189864 A * | 9/2013 |

OTHER PUBLICATIONS

Office Action dated Oct. 3, 2022, issued in counterpart IN Application No. 202214005705, with English Translation (5 pages).

* cited by examiner

STEAM VALVE

BACKGROUND OF THE INVENTION

1. Field of the Invention

The present invention relates to a steam valve that is, for example, installed for a steam turbine and used for interruption of steam or flow rate adjustment, and particularly to a steam valve having a cylinder for driving a valve disc on the lower side of a valve casing.

2. Description of the Related Art

A steam valve described in JP-H11-343811-A is cited as a conventional technology related to the present application. The steam valve disclosed in this document is configured such that a valve seat is installed facing upward and a valve disc is raised and lowered with respect to the valve seat. In the steam valve according to this document, the upper surface of the valve seat is flush with or higher than an inlet passage of steam in a valve casing. A contrivance is thus made such that a drain flows to the inlet side of the steam and does not easily stay in the vicinity of the valve seat.

PRIOR ART DOCUMENT

Patent Document

Patent Document 1: JP-H11-343811-A

SUMMARY OF THE INVENTION

It is difficult to completely prevent the steam flowing in the valve casing from leaking from a clearance between the valve casing and a valve stem to the outside of the valve casing. A temperature outside the valve casing is lower than a temperature within the valve casing. Thus, the steam leaking out from the valve casing condensates into a drain. When a cylinder that drives the valve disc is disposed on the lower side of the valve casing, the drain goes along the valve stem and reaches the cylinder, and the cylinder may be corroded due to staying of the drain.

It is an object of the present invention to provide a steam valve that can suppress the staying of a drain on a cylinder attached to the lower side of a valve casing and thus suppress the occurrence of corrosion of the cylinder.

In order to achieve the above object, according to the present invention, there is provided a steam valve including a valve casing, a valve disc disposed within the valve casing, a cylinder disposed on a lower side of the valve casing and having a piston rod extending upward, a valve stem vertically penetrating a lower portion of the valve casing and having one end coupled to the piston rod via a coupling and having another end coupled to the valve disc, a cover having a larger diameter than the piston rod and the coupling and configured to separate the piston rod and the coupling from each other by being interposed between the piston rod and the coupling, and a tubular skirt hanging down from a peripheral portion of the cover and surrounding a periphery of a head portion of the piston rod.

According to the present invention, it is possible to suppress the staying of the drain on the cylinder attached to the lower side of the valve casing and thus suppress the occurrence of corrosion of the cylinder.

DESCRIPTION OF THE PREFERRED EMBODIMENT

An embodiment of the present invention will hereinafter be described with reference to the drawings.

Steam Turbine Plant

Figure 1:
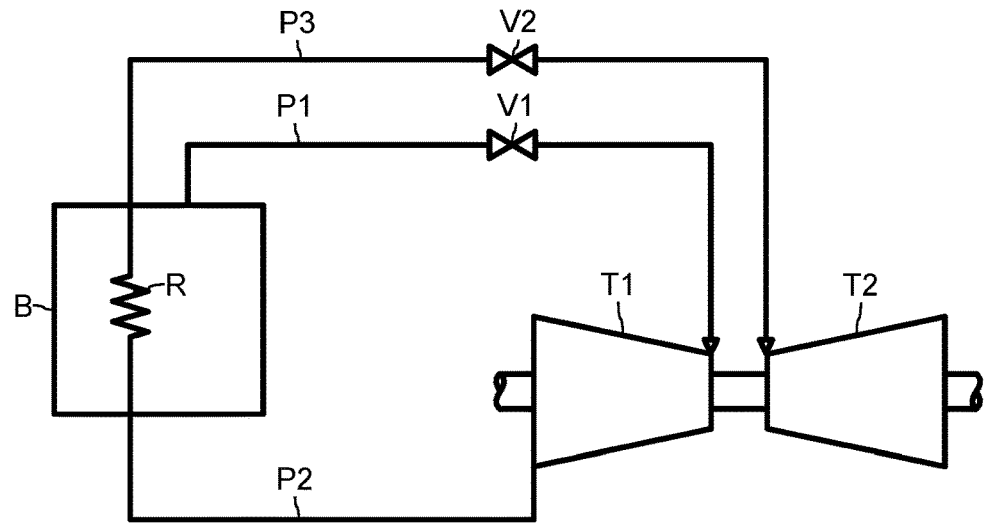
FIG. 1 is a schematic diagram of an example of a steam turbine plant to which a steam valve according to one embodiment of the present invention is applied.

FIG. 1 is a schematic diagram of an example of a steam turbine plant to which a steam valve according to one embodiment of the present invention is applied. In the steam turbine plant of the figure, a main steam generated in a boiler B is supplied to a first turbine (high pressure turbine) T1 via a main steam pipe P1 and drives the first turbine T1. The steam that has driven the first turbine T1 is introduced into a reheater R via a return pipe P2 and heated by the reheater R, is then supplied to a second turbine (intermediate pressure turbine) T2 via a reheat steam pipe P3 and drives the second turbine T2. Rotating shafts of the first turbine T1 and the second turbine T2 are coupled to each other. Typically, a third turbine (low-pressure turbine) is often further coaxially coupled to the first turbine T1 and the second turbine T2. In addition, the rotating shafts of the first turbine T1 and the second turbine T2 are, for example, coupled to a rotating shaft of a generator (not depicted). The generator is driven by the first turbine T1 and the second turbine T2 to generate electric power.

The main steam pipe P1 is provided with a main steam stop valve V1. The reheat steam pipe P3 is provided with a reheat steam stop valve V2. The steam supplied from the boiler B to the first turbine T1 can be interrupted by the main steam stop valve V1. The steam supplied from the reheater R to the second turbine T2 can be interrupted by the reheat steam stop valve V2.

Steam Valve

Figure 2:
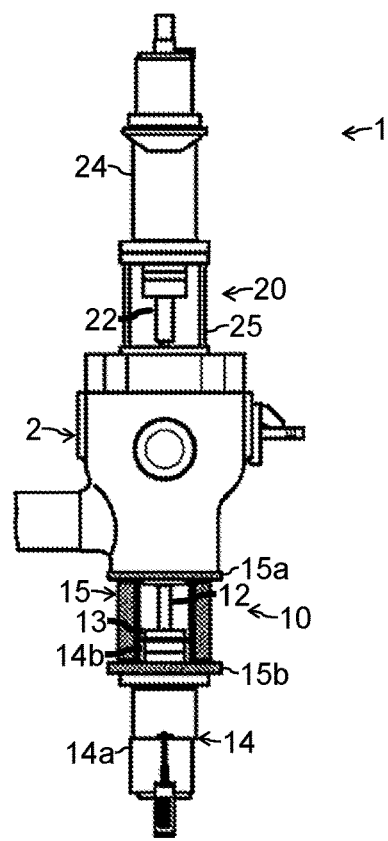
FIG. 2 is an external view depicting a general configuration of the steam valve according to one embodiment of the present invention.
Figure 3:
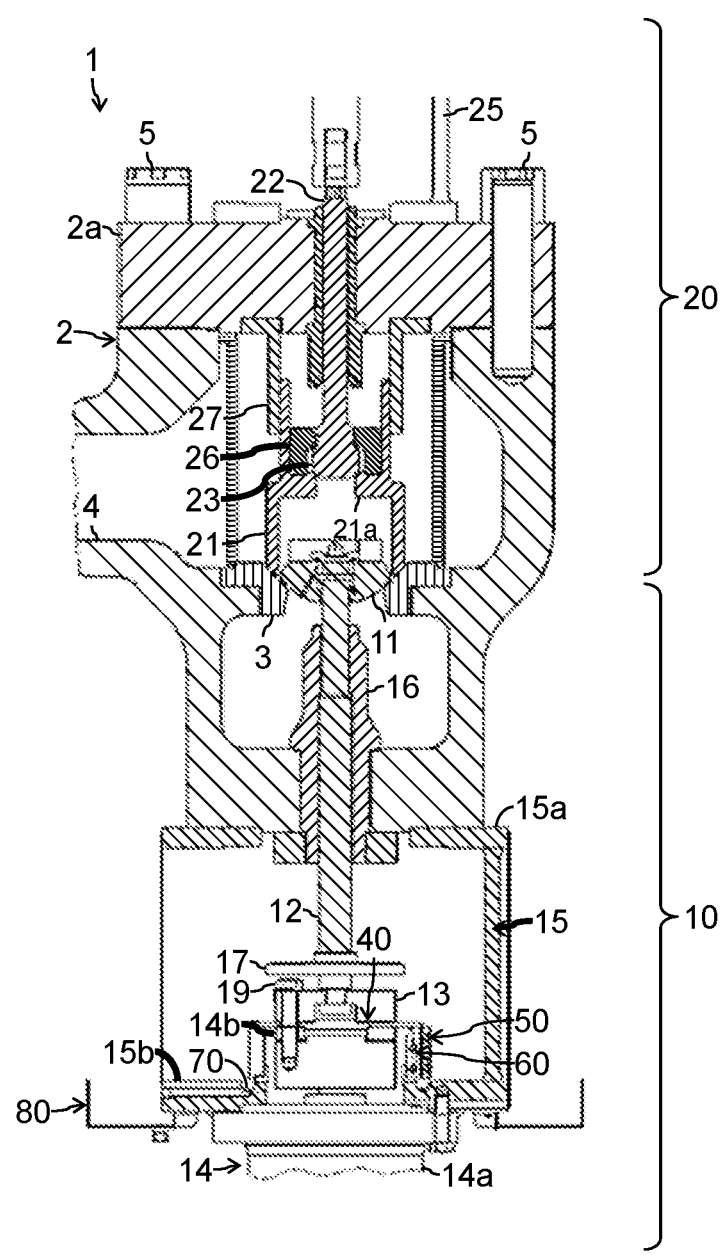
FIG. 3 is a sectional view depicting an internal structure of principal parts of the steam valve depicted in FIG. 2.

FIG. 2 is an external view depicting a general configuration of the steam valve according to one embodiment of the present invention. FIG. 3 is a sectional view depicting an internal structure of principal parts of the steam valve depicted in FIG. 2. The steam valve 1 depicted in these figures can, for example, be applied to at least one of the main steam stop valve V1 and the reheat steam stop valve V2 in the example of FIG. 1. The steam valve 1 is a composite valve obtained by combining a steam governing valve 20 with a steam stop valve 10. As depicted in FIG. 3, the steam governing valve 20 and the steam stop valve 10 are provided so as to be vertically opposed to each other. FIG. 3 depicts a valve closed state of the steam governing valve 20 and the steam stop valve 10. The steam stop valve 10 is normally open (fully open). However, at a time of a turbine trip, the steam stop valve 10 is closed (fully closed) to interrupt the supply of the steam to the steam turbine. When the operation of the steam turbine is resumed, the steam stop valve 10 is opened again. The steam governing valve 20 controls the flow rate of the steam supplied to the steam turbine according to the opening degree of the steam governing valve 20.

Steam Governing Valve

The steam governing valve 20 includes a valve casing 2, a valve seat 3, a valve disc 21, a valve stem 22, a slave valve 23, and a cylinder 24. The valve casing 2 is a valve box shared by the steam governing valve 20 and the steam stop valve 10 and is a hollow member having a steam inlet 4 and a steam outlet (not depicted). An upper portion of the valve casing 2 is opened. However, this aperture is closed by an upper lid 2a fixed by a plurality of sets of bolts and nuts 5. The valve seat 3 is provided within the valve casing 2 and is fixed to an inner wall of the valve casing 2. The valve seat 3 is also shared by the steam governing valve 20 and the steam stop valve 10.

The cylinder 24 is, for example, a hydraulic cylinder. The cylinder 24 is supported outside the valve casing 2 and on the upper side of the valve casing 2, or supported by the upper surface of the upper lid 2a of the valve casing 2 via a frame-shaped yoke 25 in the present example. The upper lid 2a and the yoke 25 are fastened to each other by bolts. Similarly, a cylinder tube of the cylinder 24 and the yoke 25 are also fastened to each other by bolts. A piston rod of the cylinder 24 extends downward in a space inside the yoke 25. The valve stem 22 is coupled to a distal end of the piston rod of the cylinder 24 via a coupling. The valve stem 22 vertically penetrates the upper lid 2a of the valve casing 2. The slave valve 23 is attached to a lower end of the valve stem 22 located within the valve casing 2. This slave valve 23 engages with the valve disc 21.

The valve disc 21 is a tubular member. The valve disc 21 vertically slides while being guided by a guide tube 27 fixed to the lower surface of the upper lid 2a by bolts. The valve disc 21 thus advances and retreats with respect to the valve seat 3. The valve disc 21 has a partition wall 21a provided to an intermediate portion thereof in an upward-downward direction, so that a space within the valve disc 21 is separated vertically by the partition wall 21a. However, a central portion of the partition wall 21a is opened, and this aperture is closed by the slave valve 23. The slave valve 23 is constrained with respect to the valve disc 21 by a pressing ring 26 with some play.

When the cylinder 24 contracts, the slave valve 23 is separated from the partition wall 21a and opens the aperture. Next, the valve disc 21 is raised via the slave valve 23, and the valve disc 21 is separated from the valve seat 3, so that the steam governing valve 20 is opened. Conversely, when the cylinder 24 expands, the valve disc 21 is lowered and seated on the valve seat 3. Next, the slave valve 23 closes the aperture of the partition wall 21a and presses the valve disc 21 against the valve seat 3, so that the steam governing valve 20 is closed.

When the steam governing valve 20 is opened, a differential pressure across the valve becomes a resistance in operation of the valve disc 21. However, because the slave valve 23 having a small pressure receiving area opens first, the differential pressure across the valve disc 21 is reduced, and the valve disc 21 operates smoothly. The flow rate of the steam supplied to the steam turbine is controlled by adjusting the opening degree of the steam governing valve 20 (that is, a distance between the valve disc 21 and the valve seat 3) by the cylinder 24 in a state in which the steam stop valve 10 is opened.

Steam Stop Valve

Figure 4:
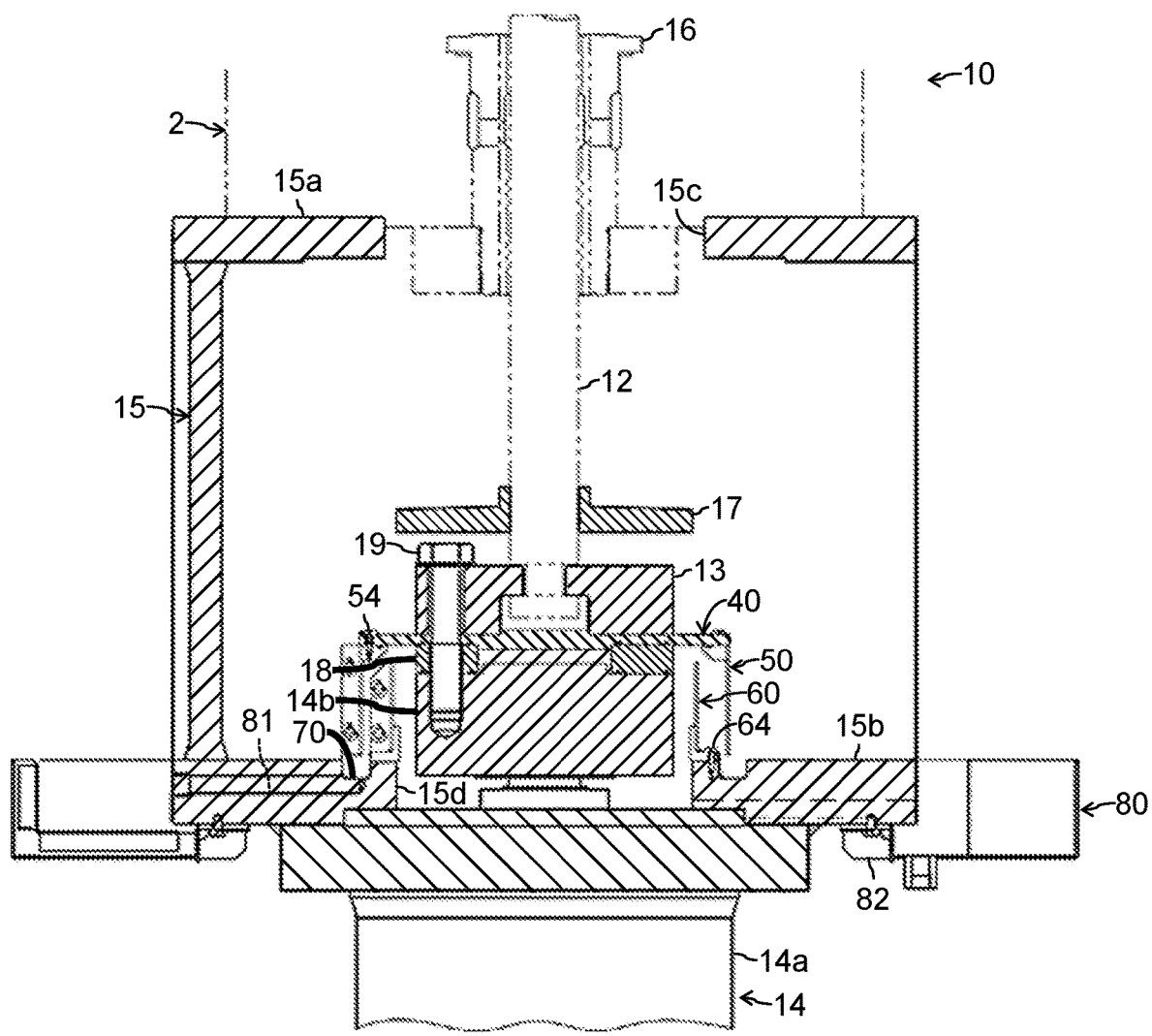
FIG. 4 is an enlarged view in which a configuration of a coupling portion between a valve stem and a cylinder in a steam stop valve depicted in FIG. 2 is extracted and depicted.

FIG. 4 is an enlarged view in which a configuration of a coupling portion between the valve stem and the cylinder in the steam stop valve is extracted and depicted. As depicted in FIG. 3 and FIG. 4, the steam stop valve 10 includes the valve casing 2 and the valve seat 3 shared with the steam governing valve 20 as well as a valve disc 11, a valve stem 12, and a cylinder 14.

The cylinder 14 is a hydraulic cylinder. The cylinder 14 is disposed outside the valve casing 2 and on the lower side of the valve casing 2 and is supported by the lower surface of the valve casing 2 via a frame-shaped yoke 15. The yoke 15 is similar to the yoke 25 of the steam governing valve 20 in terms of configuration and is a welded structure having a top 15a and a bottom plate 15b coupled to each other by a plurality of columns (three columns in the present example). The top 15a of the yoke 15 and the lower surface of the valve casing 2 are fastened to each other by bolts. Similarly, the bottom plate 15b of the yoke 15 and a cylinder tube 14a of the cylinder 14 are also fastened to each other by bolts. The top 15a and the bottom plate 15b of the yoke 15 are formed in a doughnut shape and have apertures 15c and 15d provided at centers thereof. A piston rod 14b of the cylinder 14 is passed through the aperture 15d of the bottom plate 15b to which the cylinder 14 is attached. The valve stem 12 is passed through the aperture 15c of the top 15a to which the valve casing 2 is attached.

The piston rod 14b of the cylinder 14 extends upward in a space inside the yoke 15. One end (lower end) of the valve stem 12 is coupled to a distal end of the piston rod 14b, that is, an upper end of the piston rod 14b via a coupling 13. The coupling 13 is divided in two in a circumferential direction (that is, as viewed from above or below), and two C-shaped parts sandwich a stepped portion of the lower end of the valve stem 12. The coupling 13 is locked to the lower end of the valve stem 12 by coupling these two parts to each other. The piston rod 14b and the valve stem 12 are coupled to each other by fastening the coupling 13 thus fitted to the valve stem 12 to a head portion of the piston rod 14b by bolts.

The valve stem 12 is axially slidably inserted into a bush 16 fixed to a lower portion (bottom plate) of the valve casing 2 and vertically penetrates the lower portion of the valve casing 2. The valve disc 11 is coupled to another end (upper end) of the valve stem 12 located within the valve casing 2 (FIG. 3).

The valve disc 11 has a lower surface formed as a downwardly protruding curved surface. The valve disc 11 is located inside the valve disc 21 of the steam governing valve 20 and higher than the valve seat 3. As the cylinder 14 contracts, the valve disc 11 vertically advances and retreats with respect to the valve seat 3. When the valve disc 11 is lowered and the curved surface of the valve disc 11 is seated on the valve seat 3, the steam stop valve 10 is closed. When the valve disc 11 is raised and separated from the valve seat 3, the steam stop valve 10 is opened.

Cylinder Protecting Mechanism

While the steam valve 1 is opened and the steam is supplied to the steam turbine, part of the steam passing through the inside of the valve casing 2 can leak from, for example, a space between the bush 16 and the valve stem 12 to the outside of the valve casing 2. Because the valve stem 12 slides with respect to the bush 16, it is difficult to completely interrupt the flowing of the steam between the bush 16 and the valve stem 12. A temperature outside the valve casing 2 is lower than a temperature within the valve casing 2. Thus, the steam leaking out from the valve casing 2 condensates into a drain. This drain trickles down along the valve stem 12. When the drain going down the valve stem 12 reaches the cylinder 14 and stays, the drain may corrode constituent parts of the cylinder 14. In the present embodiment, outside the valve casing 2, a collar 17 is attached to the valve stem 12 so as to cover an upper portion of the coupling 13. This provides a structure in which the collar 17 serves as an umbrella and it is thus difficult for waterdrops to fall onto the coupling 13, leaving a possibility of the drain passing between the collar 17 and the valve stem 12. There is also a possibility that the drain flowing on the upper surface of the collar 17 to an outer circumference thereof goes around to the lower surface of the collar 17 and adheres to the peripheral surface of the valve stem 12 again.

Accordingly, as depicted in FIG. 4, the steam stop valve 10 is provided with a cover 40, a skirt 50, a fence 60, a slit 70, and a drain pan 80 in order to prevent the drain trickling down the valve stem 12 from reaching the cylinder 14. These elements each protect the cylinder 14 from the drain.

Cover

Figure 5:
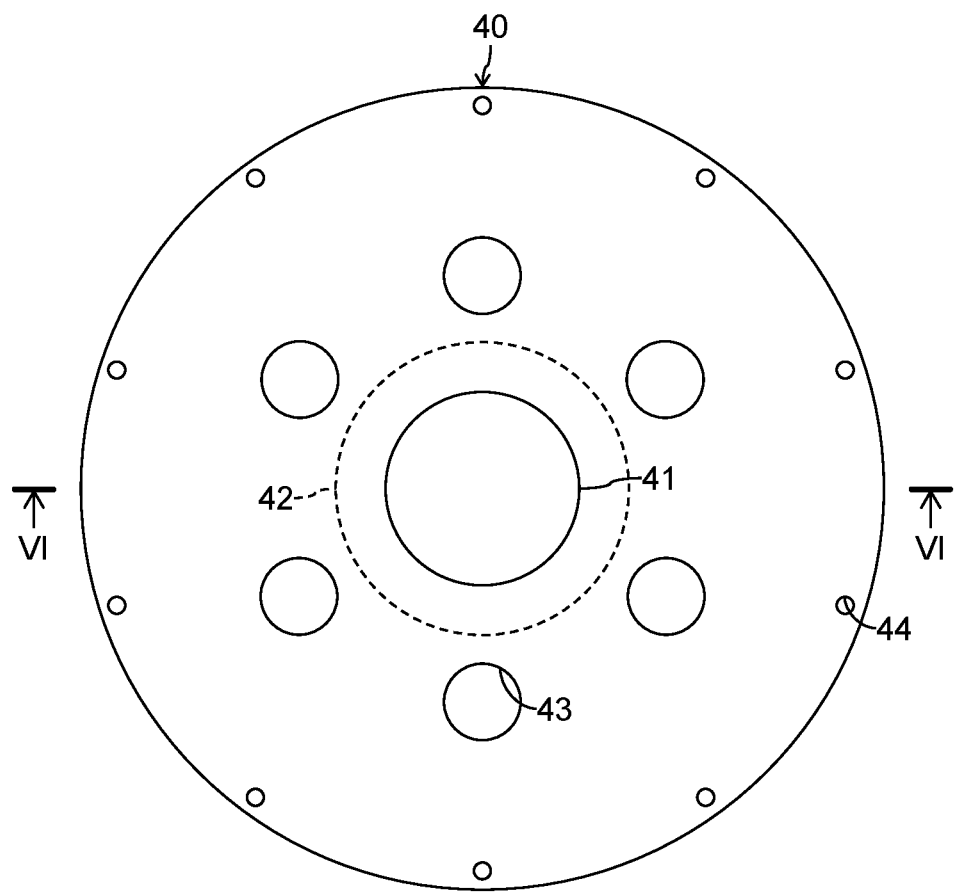
FIG. 5 is a plan view of a cover provided to the steam stop valve depicted in FIG. 2.
Figure 6:
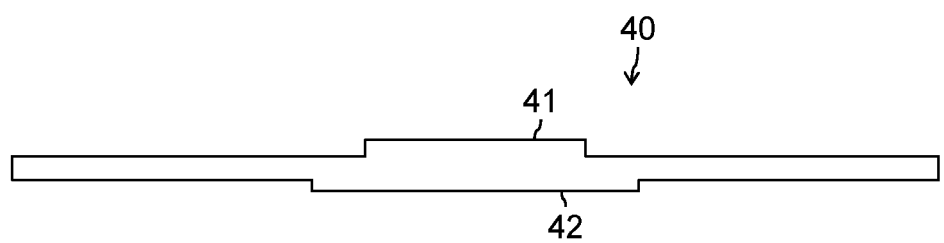
FIG. 6 is a sectional view of the cover, the sectional view being taken in a direction of arrows along a line VI-VI in FIG. 5.

FIG. 5 is a plan view of the cover. FIG. 6 is a sectional view of the cover, the sectional view being taken in a direction of arrows along a line VI-VI in FIG. 5. As depicted in these figures, the cover 40 is a disc-shaped member and is sandwiched by the head portion of the piston rod 14b and the coupling 13 from above and below. In this case, as depicted in FIG. 4, the upper surface of the head portion of the piston rod 14b has a circular protruding portion at a center thereof, and a ring-shaped spacer 18 is interposed between a peripheral portion of this protruding portion and the cover 40. The protruding portion of the piston rod 14b is inserted into the inside of the ring-shaped spacer 18, so that the piston rod 14b and the spacer 18 are positioned with respect to each other by a generally-called socket and spigot structure.

A central portion of the upper surface of the cover 40 is provided with a circular protruding portion 41 (FIG. 6). This protruding portion 41 is inserted into the ring-shaped coupling 13, so that the cover 40 and the coupling 13 are positioned with respect to each other by a socket and spigot structure (FIG. 4). Similarly, a central portion of the lower surface of the cover 40 is also provided with a circular protruding portion 42 (FIG. 6). This protruding portion 42 is inserted into the ring-shaped spacer 18, so that the cover 40 and the spacer 18 are positioned with respect to each other by a socket and spigot structure (FIG. 4). The cover 40 is thus aligned concentrically with the coupling 13 and the piston rod 14b.

With regard to a fixing structure for the cover 40, a plurality of through holes 43 (six through holes 43 in the present example) that penetrate in the upward-downward direction (thickness direction) so as to surround the peripheries of the upper and lower protruding portions 41 and 42 are provided to the cover 40 at equal intervals in a circumferential direction. A plurality of through holes having a similar diameter to that of the through holes 43 are provided also to the coupling 13 and the spacer 18 so as to correspond to the through holes 43. A plurality of bolt holes are provided to the upper surface of the piston rod 14b so as to correspond to the through holes 43. The cover 40 is integrally fastened to the coupling 13, the spacer 18, and the piston rod 14b by aligning the positions of the through holes of the coupling 13, the cover 40, and the spacer 18 with the bolt holes of the piston rod 14b, and inserting and screwing bolts 19 into the respective holes. Incidentally, a peripheral portion in the upper surface of the cover 40 is provided with a plurality of through holes 44 (ten through holes 44 in FIG. 5) for coupling with the skirt 50 at equal intervals in the circumferential direction.

The diameter of the cover 40 is set larger than the diameter of the coupling 13 and the piston rod 14b and the diameter of the aperture 15d of the bottom plate 15b of the yoke 15. In addition, except for the through holes 43 and 44 described above, the cover 40 is of a solid structure not having apertures, including a central portion thereof. Therefore, the cover 40 separates the coupling 13 and the piston rod 14b from each other by being interposed between the coupling 13 and the piston rod 14b, and the cover 40 projects outward in a radial direction and extends in a horizontal direction from peripheral portions of the coupling 13 and the piston rod 14b.

Skirt

Figure 7:
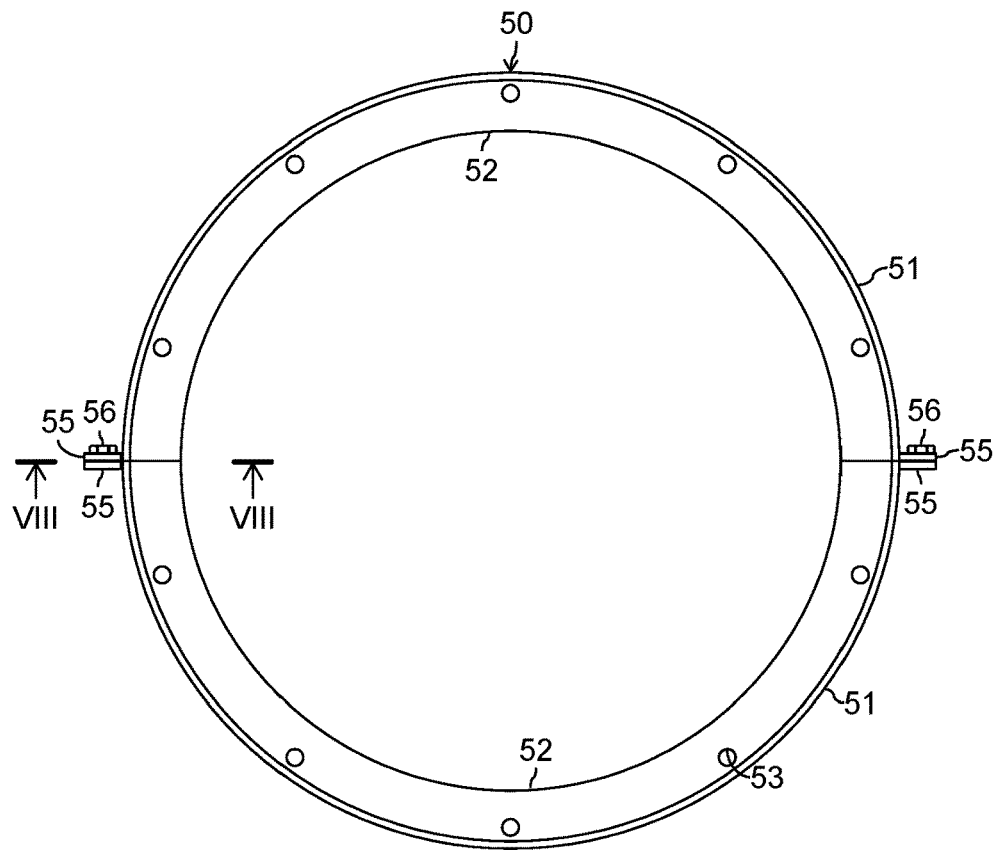
FIG. 7 is a plan view of a skirt provided to the steam stop valve depicted in FIG. 2.
Figure 8:
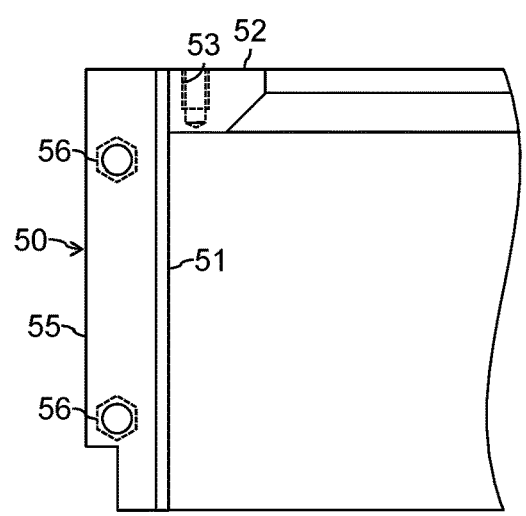
FIG. 8 is a partial view of the skirt, the partial view being taken in a direction of arrows along a line VIII-VIII in FIG. 7.

FIG. 7 is a plan view of the skirt. FIG. 8 is a partial view of the skirt, the partial view being taken in a direction of arrows along a line VIII-VIII in FIG. 7. As depicted in these figures, the skirt 50 includes a main body 51 and a flange 52. The main body 51 has a configuration obtained by bending a thin plate and thereby forming the thin plate into a tubular shape. The outside diameter (diameter) of the tubular main body 51 is approximately equal to the diameter of the cover 40 or slightly smaller than the diameter of the cover 40 and is larger than the diameter of the coupling 13 and the piston rod 14b and the diameter of the aperture 15d of the bottom plate 15b of the yoke 15. The flange 52 is a ring-shaped member. The flange 52 is attached, for example, by welding to an upper end of the inner peripheral surface of the tubular main body 51. The upper surface of the flange 52 is provided with a plurality of threaded holes 53 (ten threaded holes 53 in the present example) so as to correspond to the through holes 44 of the cover 40. The skirt 50 is fastened integrally with the cover 40 by making the flange 52 abut against the lower surface of the cover 40, aligning the positions of the threaded holes 53 with the through holes 44, and fastening screws 54 (FIG. 4).

With the above-described configuration, the main body 51 of the skirt 50 hangs down from the peripheral portion of the cover 40 and surrounds the periphery (entire periphery) of the head portion of the piston rod 14b, as depicted in FIG. 4. A lower end of the main body 51 of the skirt 50 is lowered to a height nearly equal to the upper surface of the bottom plate 15b of the yoke 15 in a state in which the cylinder 14 is contracted, that is, in a state in which the steam stop valve 10 is closed (FIG. 4).

Incidentally, the skirt 50 in the present embodiment is divided in two in a circumferential direction and is formed by two C-shaped parts as viewed in plan. Brackets 55 are provided to respective end portions in the circumferential direction of the respective parts so as to project outward in a radial direction. The skirt 50 is formed in a tubular shape by coupling the brackets 55 to each other at two upper and lower positions by bolts 56.

Fence

Figure 9:
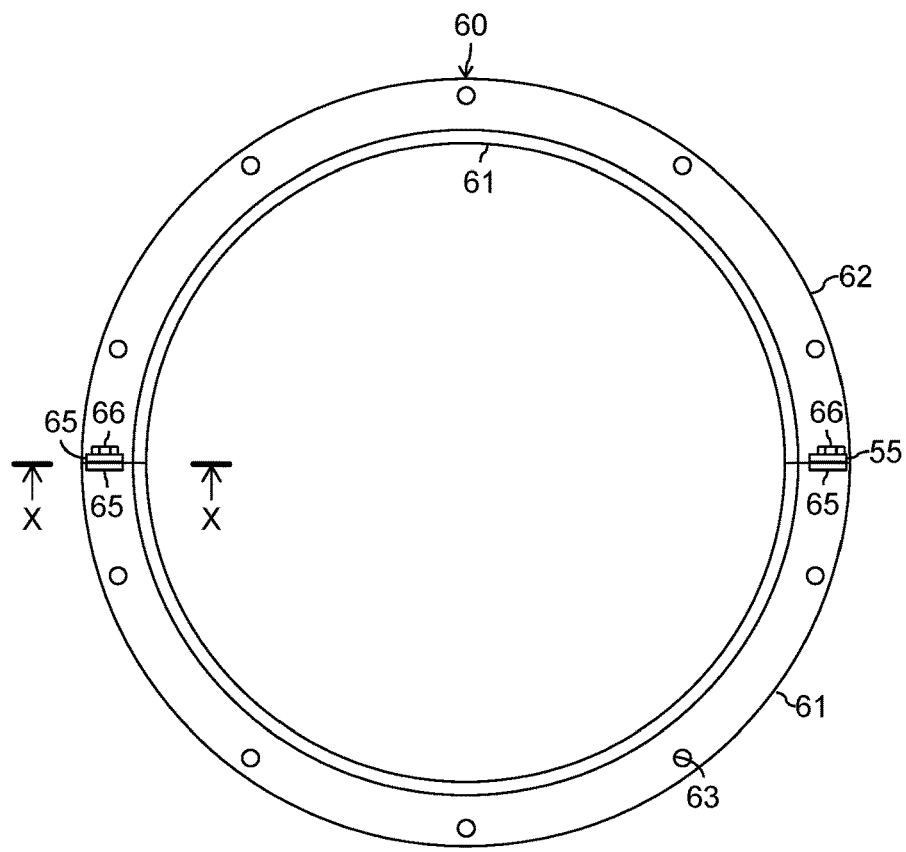
FIG. 9 is a plan view of a fence provided to the steam stop valve depicted in FIG. 2.
Figure 10:
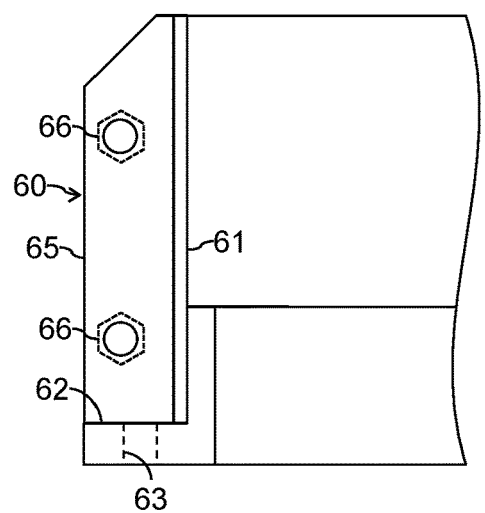
FIG. 10 is a partial view of the fence, the partial view being taken in a direction of arrows along a line X-X in FIG. 9.

FIG. 9 is a plan view of the fence. FIG. 10 is a partial view of the fence, the partial view being taken in a direction of arrows along a line X-X in FIG. 9. As depicted in these figures, the fence 60 includes a main body 61 and a flange 62. The main body 61 has a configuration obtained by bending a thin plate and thereby forming the thin plate into a tubular shape. The outside diameter (diameter) of the main body 61 and the flange 62 is smaller than the diameter of the cover 40 and the inside diameter (diameter) of the skirt 50. The inside diameter (diameter) of the main body 61 and the flange 62 is larger than the diameter of the spacer 18 and the piston rod 14b. The flange 62 is a ring-shaped member. The flange 62 is attached, for example, by welding to a lower end of the tubular main body 61. The flange 62 is provided with a plurality of through holes 63 (ten through holes 63 in the present example) at equal intervals in a circumferential direction. The fence 60 is fixed to the bottom plate 15b of the yoke 15 by making the flange 62 abut against the upper surface of the bottom plate 15b of the yoke 15 so as to surround the aperture 15d and fastening screws 64 (FIG. 4) which is passed through the through holes 63.

With the above-described configuration, the main body 61 of the fence 60 rises from the upper surface of the bottom plate 15b of the yoke 15 and surrounds the periphery (entire periphery) of the aperture 15d. An upper end of the main body 61 of the fence 60 is positioned at a height close to the lower surface of the cover 40, for example, a height between a lower end of the spacer 18 and the lower surface of the cover 40 in a state in which the cylinder 14 is contracted, that is, in a state in which the steam stop valve 10 is closed (FIG. 4).

Incidentally, as with the skirt 50, the fence 60 is divided in two in a circumferential direction and is formed by two C-shaped parts as viewed in plan. Brackets 65 are provided to respective end portions in the circumferential direction of the respective parts so as to project outward in a radial direction. The fence 60 is formed in a tubular shape by coupling the brackets 65 to each other at two upper and lower positions by bolts 66.

Slit

As depicted in FIG. 4, the slit 70 is formed in a ring shape in the upper surface of the bottom plate 15b of the yoke 15 and surrounds the peripheries (entire peripheries) of the aperture 15d and the flange 62 of the fence 60. The sectional shape of the slit 70 is a U-shape opening upward. The slit 70 is recessed with respect to the upper surface of the bottom plate 15b of the yoke 15. A circle described by a center line of the slit 70 is similar to the diameter of the main body 51 of the skirt 50. The slit 70 is thus vertically opposed to the lower end of the main body 51 of the skirt 50.

Drain Pan

The drain pan 80 is formed in a ring shape on a lower portion of the yoke 15 so as to surround the periphery (entire periphery) of the yoke 15. The diameter of an inner circumference of the ring-shaped drain pan 80 is larger than a maximum diameter of the cylinder tube 14a. A clearance is thus interposed between the cylinder 14 and the drain pan 80. The drain pan 80 has a ring-shaped attaching seat 82 provided to an inner peripheral portion thereof. The drain pan 80 is fixed to the bottom plate 15b of the yoke 15 by making the attaching seat 82 abut against the lower surface of the bottom plate 15b and fastening the attaching seat 82 by bolts. A drainage 81 is formed in the bottom plate 15b of the yoke 15 (within a plate thickness of the bottom plate 15b in the present example). This drainage 81 connects the slit 70 and the drain pan 80 to each other.

Drain Separating Operation

During operation of the steam turbine, the inside of the valve casing 2 is filled with the steam supplied to the steam turbine. Because the valve stem 12 is a sliding part, it is difficult to achieve complete sealing between the valve stem 12 and the bush 16, and part of the steam can pass between the valve stem 12 and the bush 16 and leak out from the valve casing 2. The steam leaking out from the valve casing 2 condensates into a drain due to a sharp decrease in temperature. The drain trickles down along the valve stem 12. The drain going down the valve stem 12 is once received by the collar 17 and can pass the outer circumference or inner circumference of the collar 17 and go over the collar 17. The drain going over the collar 17 and down the valve stem 12 reaches the coupling 13 and can pass the inner circumference or outer circumference of the coupling 13. However, the coupling 13 and the piston rod 14b are separated from each other by the disc-shaped cover 40. Therefore, the drain going over the coupling 13 is surely received by the cover 40. The drain received by the cover 40 can escape only to the outside in the radial direction and therefore flows on the upper surface of the cover 40 to the outer circumferential side. Because the skirt 50 hangs down from the peripheral portion of the cover 40, the drain guided to the periphery of the cover 40 trickles down along the skirt 50 without going around to the lower surface of the cover 40. Then, the drain is introduced into the slit 70 provided to the bottom plate 15b of the yoke 15 and is separated into the drain pan 80 through the drainage 81. Even if the drain overflows from the slit 70 or adheres to the inner circumferential side of the slit 70, the fence 60 encloses the entire periphery of the aperture 15d of the bottom plate 15b of the yoke 15. Hence, the drain on the bottom plate 15b is dammed up by the fence 60 without passing through the aperture 15d and reaching the cylinder 14.

Effects (1) According to the present embodiment, the cover 40 separates the coupling 13 and the piston rod 14b from each other. Thus, the drain going over the coupling 13 does not come into contact with the piston rod 14b. Further, because the skirt 50 hangs down from the cover 40, the drain flowing on the upper surface of the cover 40 does not go around to the lower surface of the cover 40, and the drain can be separated and introduced to the upper surface of the bottom plate 15b of the yoke 15 without coming into contact with the piston rod 14b. Consequently, it is possible to suppress staying of the drain on the cylinder 14 attached to the lower side of the valve casing 2 and thus suppress the occurrence of corrosion of the cylinder.

(2) In addition, the drain going down the skirt 50 and introduced to the upper surface of the bottom plate 15b is received by the slit 70 opposed to the skirt 50 and is introduced into the drain pan 80 via the drainage 81. By thus keeping the drain into the drain pan 80, it is possible to suppress the staying of the drain on the cylinder 14 more reliably. In addition, because the drain pan 80 is attached to the bottom plate 15b of the yoke 15 by the ring-shaped attaching seat 82, the drain is introduced into the drain pan 80 even if the drain goes around the outer circumferential side of the bottom plate 15b from the upper surface to the lower surface of the bottom plate 15b.

(3) Even when the drain introduced to the upper surface of the bottom plate 15b by the cover 40 and the skirt 50 flows over the slit 70 to the inner circumferential side, the drain is dammed up by the fence 60 and does not pass through the aperture 15d of the bottom plate 15b. This also contributes to an effect of suppressing the reaching of the cylinder 14 by the drain and, in turn, an effect of rust prevention of the cylinder 14.

It is to be noted that there is not necessarily a need to install the fence 60, the slit 70, the drain pan 80, and the drainage 81 in the steam valve 1 as long as the above-described essential effect (1) is obtained. For example, a configuration may be adopted such that the drain is dropped below the steam valve 1 from the bottom plate 15b of the yoke 15 or from the skirt 15 and the drain is collected in a pan installed separately from the steam valve 1.

Modifications

In the foregoing embodiment, a structure is adopted in which the cover 40 and the skirt 50 as separate members are coupled to each other. However, the cover 40 and the skirt 50 may be formed integrally with each other, that is, by one member. In addition, while the skirt 50 and the fence 60 are of a halved structure, the skirt 50 and the fence 60 may be of an integral structure.

The skirt 50 may have a configuration capable of vertical elongation and contraction by adopting a telescopic structure or a bellows structure, for example, and a lower end of the skirt 50 may be coupled to the bottom plate 15b of the yoke 15 (for example, on the inner circumferential side of the slit 70). In this case, no clearance occurs between the skirt 50 and the bottom plate 15b irrespective of an elongated or contracted state of the cylinder 14, and therefore the skirt 50 can also serve as the fence 60. When the skirt 50 can also serve as the fence 60, the fence 60 can be omitted, of course.

Description has been made by taking as an example a case where the steam valve 1 as a composite valve in which the steam governing valve 20 is added to the steam stop valve 10 is set as a target of application of the invention. However, the present invention is applicable also to a steam stop valve not having a steam governing valve or a steam governing valve not having a steam stop valve. Also in a steam stop valve not having a steam governing valve or a steam governing valve not having a steam stop valve, the cylinder is often installed on the lower side of the valve casing due to relation to other constituent elements in a steam piping system of a steam turbine plant. A problem of corrosion of the cylinder due to the trickling down of the drain leaking out from the valve casing may occur. There is thus a great significance in applying the present invention.

DESCRIPTION OF REFERENCE NUMERALS

1: Steam valve
2: Valve casing
11: Valve disc
12: Valve stem
13: Coupling
14: Cylinder
14b: Piston rod
15: Yoke
15b: Bottom plate
15d: Aperture
40: Cover
50: Skirt
60: Fence
70: Slit
80: Drain pan
81: Drainage

What is claimed is:

1. A steam valve comprising:
a valve casing;
a valve disc disposed within the valve casing;
a cylinder disposed on a lower side of the valve casing and having a piston rod extending upward;
a valve stem coupled to the piston rod, vertically penetrating a lower portion of the valve casing and having one end coupled to the piston rod via a coupling and having another end coupled to and attached to the valve disc, the piston rod being attached to the coupling;
a cover having a larger diameter than the piston rod and the coupling and configured to separate the piston rod and the coupling from each other by being interposed between the piston rod and the coupling; and
a tubular skirt hanging down from a peripheral portion of the cover such that the cover and the tubular skirt surround a periphery of a head portion of the piston rod.

2. The steam valve according to claim 1, wherein
the cylinder is supported by the valve casing via a yoke,
the yoke includes a bottom plate to which the cylinder is attached, the bottom plate includes an aperture through which the piston rod is passed, and
the bottom plate includes a tubular fence disposed on an upper surface of the bottom plate, the tubular fence being attached to the bottom plate and rising so as to surround a periphery of the aperture, the aperture being located on an inner side of the tubular fence, and the tubular fence being positioned on an inner side of the tubular skirt.

3. The steam valve according to claim 1, wherein
the cylinder is supported by the valve casing via a yoke,
the yoke includes a bottom plate to which the cylinder is attached, the bottom plate includes an aperture through which the piston rod is passed,
a ring-shaped slit is formed in an upper surface of the bottom plate of the yoke such that the ring-shaped slit surrounds a periphery of the aperture,
a lower end of the tubular skirt faces the upper surface of the bottom plate, and
the ring-shaped slit is disposed at a location of the upper surface of the bottom plate opposite to the lower end of the tubular skirt.

4. The steam valve according to claim 3, further comprising:
a drain pan disposed on a lower portion of the yoke; and a drainage configured to connect the slit and the drain pan to each other.

\* \* \* \* \*